US011041543B2

(12) United States Patent
Aberle et al.

(10) Patent No.: US 11,041,543 B2
(45) Date of Patent: Jun. 22, 2021

(54) GEARWHEEL PAIRING FOR A HELICAL GEARING, A HELICAL GEARING WITH SUCH A GEARWHEEL PAIRING, AND A USE OF SUCH A GEARWHEEL PAIRING IN HELICAL GEARINGS

(71) Applicant: IMS Gear SE & Co. KGaA, Donaueschingen (DE)

(72) Inventors: Steffen Aberle, Königsfeld (DE); Egor Melnikov, Titisee-Neustadt (DE); Sebastian Schlude, Villingen-Schwenningen (DE); Matthias Koop, Donaueschingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 184 days.

(21) Appl. No.: 15/987,671

(22) Filed: May 23, 2018

(65) Prior Publication Data

US 2018/0340602 A1    Nov. 29, 2018

(30) Foreign Application Priority Data

May 24, 2017    (EP) .................................... 17172629

(51) Int. Cl.
*F16H 1/16*      (2006.01)
*F16H 55/08*     (2006.01)
*F16H 55/22*     (2006.01)

(52) U.S. Cl.
CPC .......... *F16H 1/16* (2013.01); *F16H 55/0806* (2013.01); *F16H 55/0846* (2013.01); *F16H 55/22* (2013.01)

(58) Field of Classification Search
CPC .......... B62D 3/04; B62D 5/0454; F16H 1/04; F16H 1/12; F16H 1/125; F16H 1/16;
(Continued)

(56) References Cited

U.S. PATENT DOCUMENTS 1,861,258 A    5/1932   Bethune
3,327,548 A    6/1967   Welch
(Continued)

FOREIGN PATENT DOCUMENTS

DE    102014211402    12/2015
EP         1731799    12/2006
(Continued)

OTHER PUBLICATIONS

Korean Intellectual Property Office, "Office Action," issued in Korean Patent Application No. 10-2018-0059237, document of 7 pages, dated Jun. 21, 2019.
(Continued)

*Primary Examiner* — Prasad V Gokhale
(74) *Attorney, Agent, or Firm* — Akerman LLP; Peter A. Chiabotti

(57) ABSTRACT

A gearwheel pairing for a helical gearing, comprising a helical gear with a first toothing segment, and a worm with a second toothing segment, wherein the first toothing segment and the second toothing segment can be brought into intermeshing and form an involute toothing when intermeshed, the materials of the first and the second toothing segments are chosen such that when intermeshed there results a plastic-metal material pairing, and the toothing segment made of plastic has a first normal tooth thickness and the toothing segment made of metal has a second normal tooth thickness, wherein the ratio of the first normal tooth thickness to the second normal tooth thickness is increased by 10 to 200% with respect to a reference profile.

18 Claims, 3 Drawing Sheets

(58) Field of Classification Search
CPC ........ F16H 1/18; F16H 55/06; F16H 55/0806;
F16H 55/0813; F16H 55/0846; F16H
55/0853; F16H 55/22; F16H 2057/0213
USPC .......................................................... 74/462
See application file for complete search history.

(56) References Cited

U.S. PATENT DOCUMENTS

| | | |
|---|---|---|
| 9,435,400 B2 | 9/2016 | Cheung et al. |
| 9,618,082 B2 | 4/2017 | Itou et al. |
| 2003/0101837 A1* | 6/2003 | Abrahamsen ........ A47C 20/041 |
| | | 74/425 |
| 2006/0213302 A1* | 9/2006 | Hoffmann ............. F16H 57/039 |
| | | 74/425 |
| 2008/0223163 A1 | 9/2008 | Yamazaki et al. |
| 2009/0120711 A1* | 5/2009 | Shiino .................. B62D 5/0406 |
| | | 180/443 |
| 2016/0236707 A1 | 8/2016 | Oberle |
| 2018/0065507 A1* | 3/2018 | Napau ..................... B60N 2/06 |

FOREIGN PATENT DOCUMENTS

| | | |
|---|---|---|
| EP | 3056767 | 8/2016 |
| JP | 2013096548 | 5/2013 |
| JP | 2013155787 | 8/2013 |
| JP | 2013177972 | 9/2013 |

OTHER PUBLICATIONS

European Patent Office, "European Search Report," issued in European Patent Application No. 17 172 629.2, document of 9 pages, dated Dec. 6, 2017.

* cited by examiner

GEARWHEEL PAIRING FOR A HELICAL GEARING, A HELICAL GEARING WITH SUCH A GEARWHEEL PAIRING, AND A USE OF SUCH A GEARWHEEL PAIRING IN HELICAL GEARINGS

CROSS-REFERENCE TO RELATED APPLICATIONS

This application claims priority to European Patent Application No. 17 172 629.2, filed May 24, 2017, which is incorporated by reference in its entirety.

BACKGROUND

The present application relates to a gearwheel pairing for a helical gearing, a helical gearing with such a gearwheel pairing, and the use of such a gearwheel pairing in helical gearings.

SUMMARY

Helical gearings, which comprise a gearwheel pairing of a helical gear and a worm, have a great similarity to worm gear drives and are used in many applications, especially because they can realize large transmission ratios in a small space. On account of this attribute, helical gearings are used to a large extent in the automotive industry for the movement of two movable vehicle parts relative to each other. Since a self-locking can be realized with helical gearings, no further measures are needed to establish the position of the two vehicle parts with respect to each other, once adjusted. Examples of applications of helical gearings in the automotive industry are seat length adjustments and power windows.

The helical gear has a first toothing segment and the worm a second toothing segment, which engage by intermeshing in the helical gearing and usually form an involute toothing. Involute toothings are relatively easy to fabricate, since unlike a cycloid toothing, for example, they can be made by means of an easily performed and effective hobbing process. Furthermore, involute toothings are relatively insensitive to changes in axial spacing within certain limits, unlike a cycloid toothing, and they result in an overall quieter movement.

As already noted, helical gearings have very great similarities to worm gearings, which comprise a worm and a worm gear. Whereas with helical gearings there is a point-like contact on the helical gear with the worm, which under stress becomes a so-called pressure ellipse, in the case of a worm gearing there exists a linear contact on the worm gear by virtue of the globoidal shape of the toothing segment of the worm and/or the worm gear. Due to the special configuration of the toothing segment, worm gearings constitute a special embodiment of helical gearings. Consequently, the following remarks made regarding helical gearings also apply to worm gearings.

Involute toothings are based on a reference profile, which is standardized in DIN 867 as well as elsewhere. The reference profile corresponds to the theoretical rack profile on which the gear rolls free of play. In practice, it is the shape of the die used to produce the gear in the hobbing process. Involute toothings based on the reference profile standardized in DIN 867 are very well suited to many applications, especially when the gearwheel pairing is designed so that a metal-metal material pairing is intermeshed.

For reasons of simplified shaping, reduced weight, and less noise development, among other things, and especially in the automotive industry, plastic gears are being used increasingly, so that there may be a plastic-plastic or a metal-plastic material pairing. It turns out that known involute toothings which are based on the reference profile standardized in DIN 867 are of limited suitability for metal-plastic material pairings. Especially because of the greater deformability and the greater thermal expansion, wrong intermeshing of helical gearings in particular may occur during operation, resulting in an increased noise production, so that one of the benefits of using the plastic-metal material pairing is lost once more. Furthermore, wrong meshing results in increased wear, which progresses more rapidly in the case of gears made of plastic than for gears made of metal. Neither can a jamming of the intermeshing gears be ruled out, which may result in a loss of function of the helical gearing.

The applicant has therefore developed an involute toothing which differs from the reference profile described in DIN 867 and which shall be called hereafter the "reference profile". This reference profile for helical gearings having a gearwheel pairing of a helical gear and a worm is being produced in series and is therefore part of the prior art. Although the reference profile of the applicant represents a distinct improvement over the standardized reference profile, still the aforementioned drawbacks cannot be entirely eliminated with the reference profile.

The problem that the present disclosure proposes to solve is therefore to indicate a gearwheel pairing for a helical gearing with which the risk of wrong intermeshing between the helical gear and the worm can be reduced in a plastic-metal material pairing making use of an involute toothing.

This problem is solved with the features and structures recited herein. Advantageous embodiments of the present disclosure are also disclosed herein.

One embodiment of the present disclosure relates to a gearwheel pairing for a helical gearing, comprising a helical gear with a first toothing segment, and a worm with a second toothing segment, wherein the first toothing segment and the second toothing segment can be brought into intermeshing and form an involute toothing when intermeshed, the materials of the first and the second toothing segments are chosen such that when intermeshed there results a plastic-metal material pairing, and the toothing segment made of plastic has a first normal tooth thickness and the toothing segment made of metal has a second normal tooth thickness, wherein the ratio of the first normal tooth thickness to the second normal tooth thickness is increased by 10 to 200% and especially by 15 to 120% with respect to a reference profile.

In order to realize the plastic-metal material pairing, the helical gear must be made of metal at least in the first toothing segment and the worm of plastic at least in the second toothing segment, or vice versa. By a toothing segment is meant that segment of the respective gear in which the teeth are located.

In most instances, the helical gear will be made entirely of metal and the worm entirely of plastic, or the helical gear entirely of plastic and the worm entirely of metal, while worms or helical gears are also conceivable in which for example a metal insert part is provided and overmolded with plastic. The plastic-metal material pairing pertains to the intermeshing toothing segments, so that plastic comes into contact at the contact points or the contact lines of the helical gear and the worm.

The reference profile defines an involute toothing and shall be defined more closely afterwards. The normal tooth thickness describes the thickness of the teeth on the pitch circle of the respective gear of the toothing segment made of plastic. Because the normal tooth thickness has been increased by the indicated amount relative to the reference profile, the deformability of the teeth of the toothing segment made of plastic is reduced, so that under load the danger of wrong meshing and thus the concomitant increased noise production and increased wear are reduced.

The increasing of the normal tooth thickness of the toothing segment made of plastic requires an adapting of the normal tooth thickness of the toothing segment made of metal, so that the intermeshing can be assured. Consequently, the toothing segment made of metal may have a normal tooth thickness which is reduced accordingly as compared to the reference profile. The normal tooth thickness in this instance describes the thickness of the teeth on the pitch circle of the respective gear of the toothing segment made of metal. The reduction of the normal tooth thickness results in increased deformability of the teeth of the toothing segment made of metal, so that the deformation behaviors of the first and second toothing segment come closer to each other.

According to another embodiment, the toothing segment made of plastic has a root circle diameter which is increased by 5 to 40% and especially by 6 to 20% with respect to a reference profile. In the event that the tip circle diameter, which describes the diameter of the respective gear at the radially outer end of the gear, remains equal or almost equal, the tooth height will be reduced, thereby increasing the rigidity of the part with the toothing segment made of plastic especially when the respective part is designed as a shaft. In this case, the rigidity is increased in particular between two bearing points. Consequently, the deformation of the teeth under load is reduced, so that the danger of wrong intermeshing and the concomitant increased noise production and increased wear are reduced.

In an alternative embodiment, the normal meshing angle of the involute toothing may differ by ±5° from the reference profile and in particular is reduced by 2 to 4° relative to the reference profile. The normal meshing angle of the reference profile amounts to 20°. This also reduces the danger of wrong intermeshing and especially jamming, since the path traveled by the teeth rolling against each other is reduced.

In all embodiments the mentioned quantities are altered so that an involute toothing is still formed. The above mentioned benefits of the involute toothing, especially the easy fabrication by a hobbing process, remain in place.

One embodiment of the present disclosure relates to a helical gearing, comprising a gearwheel pairing according to one of the previous embodiments, wherein the helical gear or the worm are connected to a drive shaft and the first toothing segment of the helical gear and the second toothing segment of the worm are intermeshed.

The technical effects and benefits which can be achieved with the proposed helical gearing correspond to those which have been discussed for the present gearwheel pairing. In summary, it should be pointed out that the proposed helical gearing is able to reduce the danger of wrong intermeshing during operation of the helical gearing in a simple manner. Consequently, the noise production and the wear are kept low.

In another embodiment, the helical gear may consist of metal, be formed as a spindle nut and interact with a spindle and the worm may consist of plastic. In this embodiment, the helical gearing is especially suitable to be used in seat length adjustments of vehicles. For this, the spindle nut is braced against the spindle, mounted in rotationally locked manner in the vehicle. If the spindle nut is turned, the spindle nut will move along the longitudinal axis of the spindle. This movement is utilized for the length adjustment of the respective seat. The formation of the helical gears made of metal as a spindle nut has the following technical effect: thanks to the greater strength of metal as compared to plastic, the spindle nut made of metal can transmit larger forces to the spindle, so that in event of a crash of the vehicle the spindle nut remains engaged with the spindle, and therefore an uncontrolled movement of the seat is prevented. This reduces the risk of injury to the vehicle passenger seated on the seat.

One embodiment of the present disclosure relates to the use of a gearwheel pairing according to one of the previously mentioned embodiments in helical gearings especially according to one of the above described embodiments for auxiliary drive units, especially for seat length adjustments, in vehicles.

Another embodiment of the present disclosure relates to a gearwheel pairing for a helical gearing, comprising a helical gear with a first toothing segment, and a worm with a second toothing segment, wherein the first toothing segment and the second toothing segment can be brought into intermeshing and form an involute toothing when intermeshed, the materials of the first and the second toothing segments are chosen such that when intermeshed there results a plastic-metal material pairing, wherein the toothing segment made of plastic has a root circle diameter which is increased by 5 to 40% and especially by 6 to 20% with respect to a reference profile.

Another implementing of the present disclosure relates to a gearwheel pairing for a helical gearing, comprising a helical gear with a first toothing segment, and a worm with a second toothing segment, wherein the first toothing segment and the second toothing segment can be brought into intermeshing and form an involute toothing when intermeshed, the materials of the first and the second toothing segments are chosen such that when intermeshed there results a plastic-metal material pairing, and the normal meshing angle of the involute toothing differs by ±5° from the reference profile and in particular is reduced by 1 to 4° relative to the reference profile.

The technical effects and benefits which can be achieved with the proposed helical gearing correspond to those which have been discussed for the present gearwheel pairing. In summary, it should be pointed out that the proposed use of the above-described gearwheel pairing in a helical gearing is able to reduce the danger of wrong intermeshing during operation of the helical gearing in a simple manner. Consequently, the noise production and the wear are kept low.

BRIEF DESCRIPTION OF THE DRAWINGS

The subject matter of the present application will be explained more closely below with reference to the accompanying drawings showing exemplary embodiments in which.

DETAILED DESCRIPTION

Figure 1:
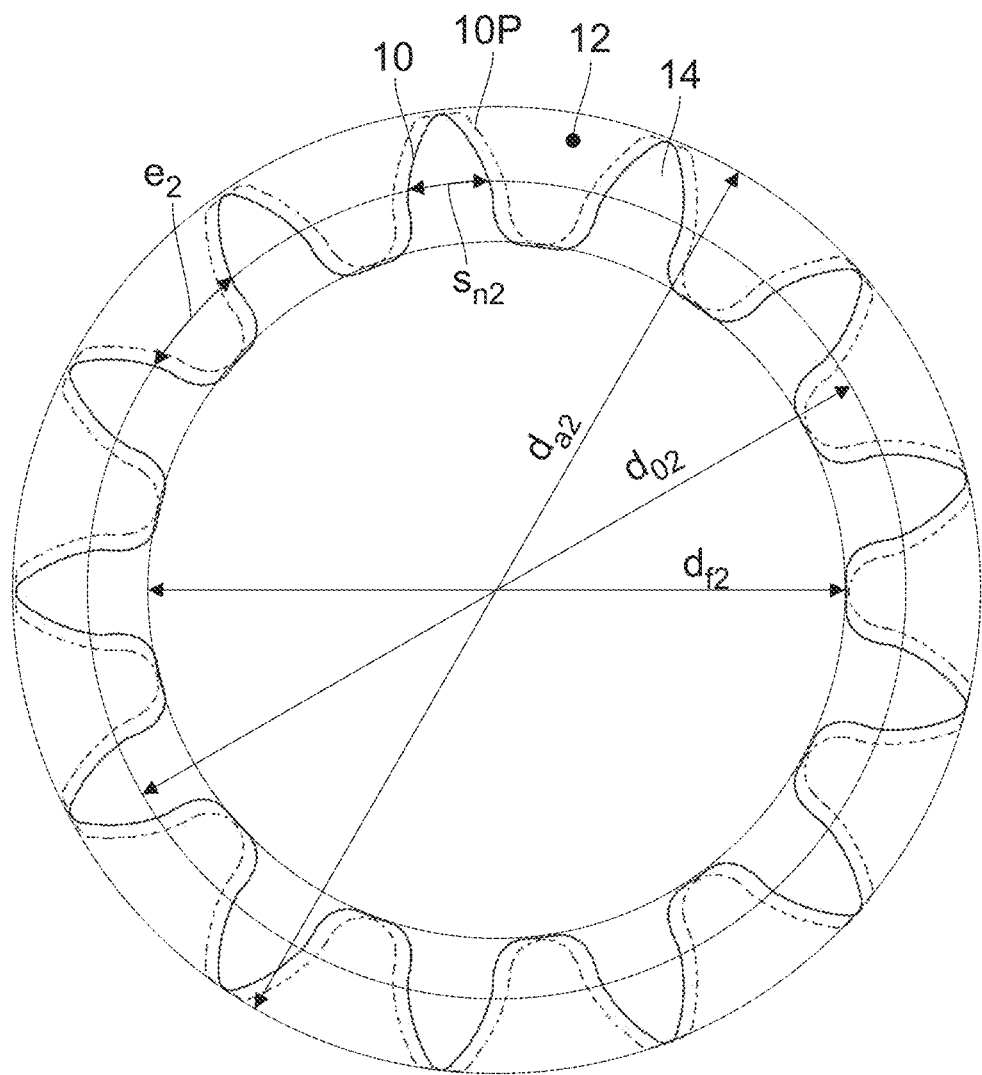
FIG. 1 shows a cross section view through a helical gear according to one embodiment of the present disclosure as compared to a helical gear based on a reference profile.

FIG. 1 shows a cross section view through a helical gear 10 according to one embodiment of the present disclosure as compared to a helical gear 10P based on a reference profile. The continuous line describes the helical gear 10 according to the present disclosure, while the broken line shows a helical gear 10P which is in series production by the applicant.

The helical gear 10 shown is made entirely of metal. The helical gear 10 has a first toothing segment 12, within which there are a number of teeth 14. Radially inward, the first toothing segment 12 is bounded by a root circle with a root circle diameter $d_{f2}$, while the first toothing segment 12 is bounded radially outward by a tip circle with a tip circle diameter $d_{a2}$.

Furthermore, the teeth 14 of the helical gear 10 have a normal tooth thickness $s_{n2}$, which designates the thickness of the teeth 14 on a pitch circle with the pitch circle diameter $d_{02}$ of the helical gear 10. The distance between two neighboring flanks of the teeth 14 is known as the gap width $e_2$. The index 2 in the above given quantities of the helical gear 10 indicates that the helical gear is made of metal.

Figure 2:
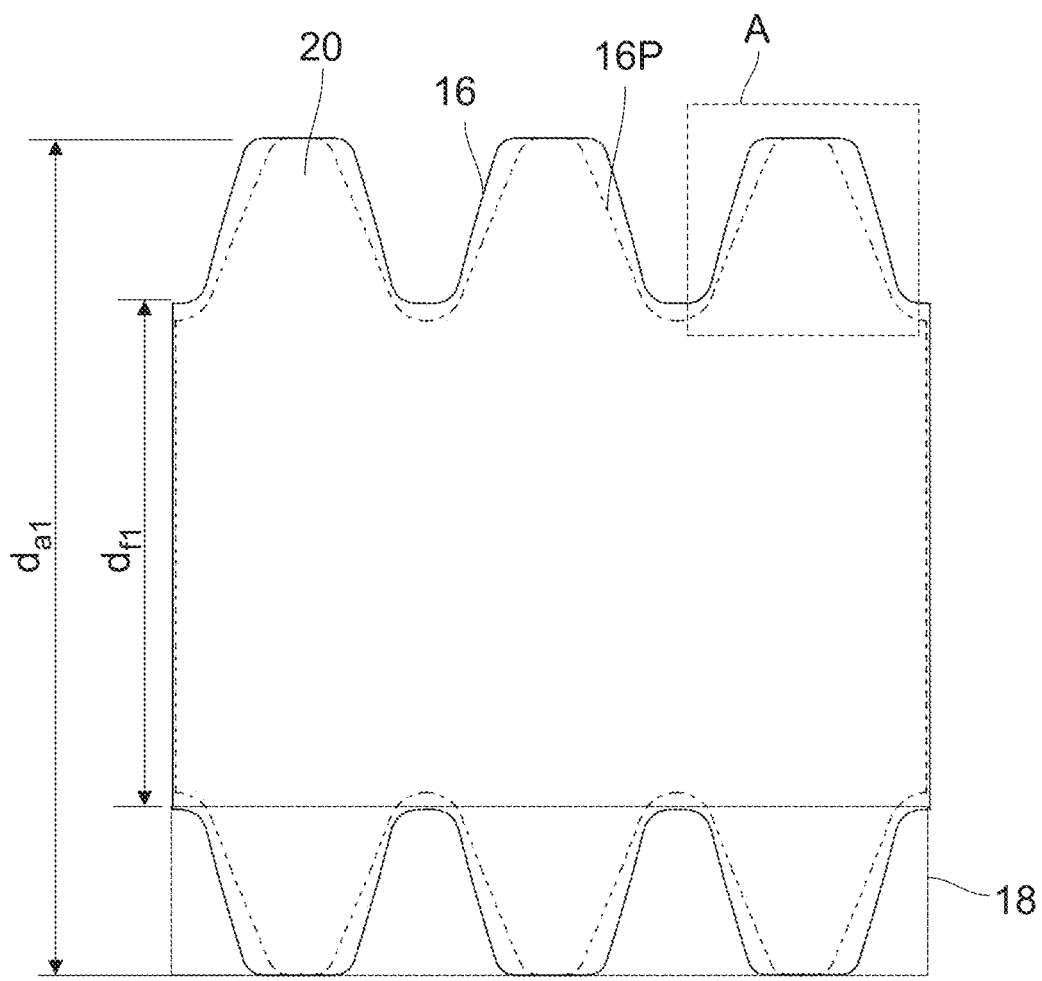
FIG. 2 shows a cross section view through a worm according to one embodiment of the present disclosure as compared to a worm based on a reference profile.

FIG. 2 shows a cross section view through a worm 16 according to one embodiment of the present disclosure as compared to a worm 16P based on a reference profile of the applicant. The continuous line describes the worm 16 according to the present disclosure, while the broken line shows a worm 16P which is in series production by the applicant.

The worm 16 shown is made entirely of plastic. The worm 16 has a second toothing segment 18, within which there are a number of teeth 20. Radially inward, the second toothing segment 18 is bounded by a root circle with a root circle diameter $d_{f1}$, while the second toothing segment 18 is bounded radially outward by a tip circle with a tip circle diameter $d_{a1}$. The index 1 in the above given quantities indicates that the worm 16 is made of plastic.

Figure 3:
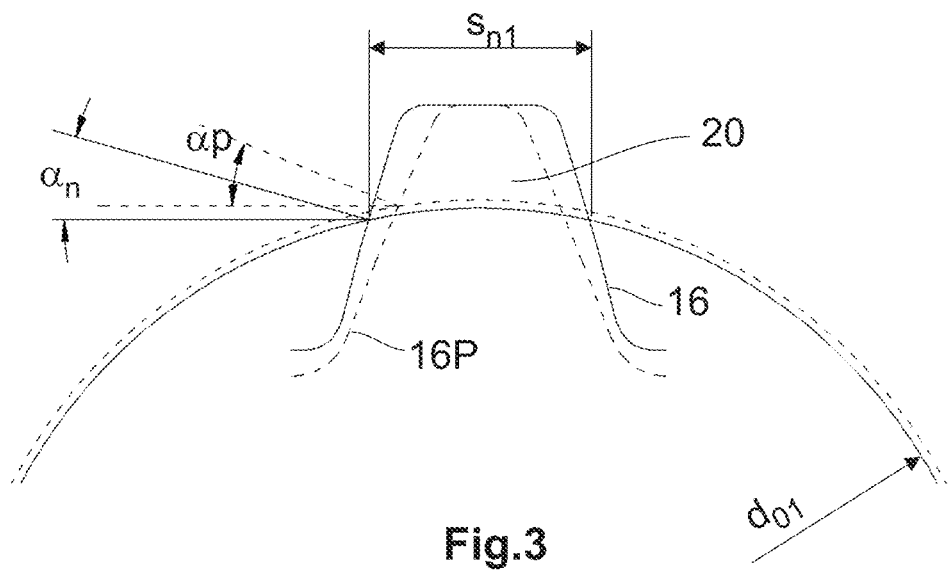
FIG. 3 shows an enlarged representation of the feature A of the worm as defined in FIG. 2.

FIG. 3 shows the feature A of the worm 16 represented in FIG. 2 in enlarged form. As can be seen from FIG. 3, the teeth 20 of the worm 16 have a normal tooth thickness $s_{n1}$, which designates the thickness of the teeth 20 on a pitch circle with the diameter $d_{01}$ of the worm 16.

Figure 4:
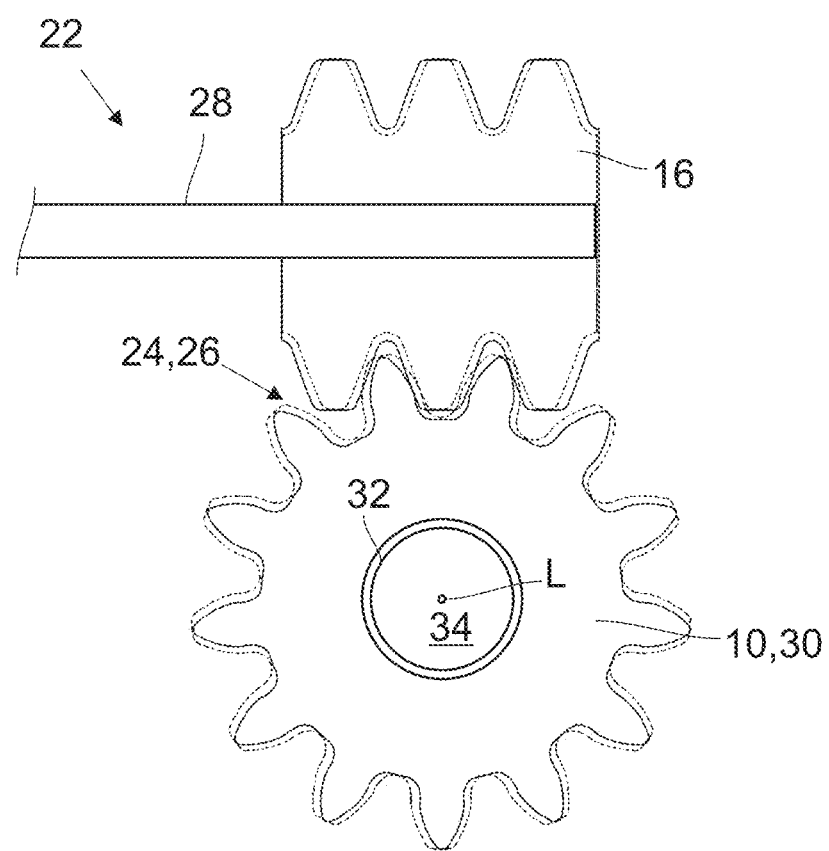
FIG. 4 shows a basic diagram of a helical gearing with a worm as represented in FIG. 1 and a helical gear as represented in FIG. 2.

FIG. 4 shows a helical gearing 22 by a basic diagram. The helical gear 10 and the worm 16 are intermeshing and together form a gearwheel pairing 24, forming an involute toothing 26. Since the helical gear 10 consists of metal and the worm 16 consists of plastic, a plastic-metal material pairing results from the intermeshing.

The worm 16 in the example shown is connected to a drive shaft 28, which can be placed in motion by an engine, not shown. The helical gear 10 is fashioned as a spindle nut 30, having an internal thread 32. By the internal thread 32, the spindle nut 30 is connected to a spindle 34, the longitudinal axis L of the spindle 34 running perpendicular to the plane of the drawing in FIG. 4. Not shown is a housing in which the gearwheel pairing 24 is arranged.

In the example depicted, the helical gearing 22 is especially suitable as a seat length adjustment in vehicles. The spindle 34 is mounted in rotationally locked manner in the vehicle. If the worm 16 is turned by the drive shaft 28 due to a corresponding activation of the engine, the rotation of the worm 16 is transmitted with the corresponding transmission ratio to the spindle nut 30. Consequently, the spindle nut 30 and the entire helical gearing 22 move along the longitudinal axis L of the spindle 34. This movement is used to adjust the length of the respective seat.

As explained, the gear pair comprising the intermeshing worm 16 and the helical gear 10 forms an involute toothing 26. In FIG. 3, the normal meshing angle $\alpha_n$ of the proposed involute toothing 26 is contrasted with the normal meshing angle $\alpha P$ of the reference profile of the applicant.

In the following, the relations of the most important quantities of involute toothings 26 are given. The most important quantities are:

$d_0$ Pitch circle diameter (mm)
$d_a$ Tip circle diameter (mm)
$d_f$ Root circle diameter (mm)
e Gap width (mm)
h Tooth height (mm)
$h_a$ Tooth tip height factor
$h_f$ Tooth root height factor
$m_n$ Normal modulus (mm)
p Pitch (mm)
$s_n$ Normal tooth thickness (mm)
x Profile shift coefficient (–)
z Number of teeth (–)
$\alpha_n$ Normal meshing angle (°)
$\gamma, \beta$ Pitch angle or helix angle (°)

These quantities stand in the following relations to each other:

For the normal tooth thickness $s_n$:

$$s_n = m_n * \left(\frac{\pi}{2} + x * \sin\alpha_n\right)$$

For the pitch circle diameter $d_0$ the following relations apply:

$$d_0 = z\frac{m_n}{\cos\beta} = z\frac{m_n}{\sin\gamma}$$

For the root circle diameter $d_f$ the following relations apply:

$$d_f = d_0 - 2*m_n*h_f + 2*x*m_n$$

For the tip circle diameter:

$$d_a = d_0 + 2*m_n*h_a + 2*x*m_n$$

For the normal modulus:

$$m_n = \frac{p}{\pi} = \frac{s+e}{\pi} \approx \frac{2s}{\pi}$$

It should be noted that the gap width e and the normal tooth thickness s of the reference profile are approximately the same for both the toothing segment made of plastic and the toothing segment made of metal, which is not the case for the proposed involute toothing 26. For the tooth height h we have:

$$h = 2.25*m_n$$

For the ratio Vsn we have:

$$V_{sn} = \frac{s_{n1}}{s_{n2}}$$

The following table shows a comparison of the important values of the proposed involute toothing 26 relative to the reference profile which is produced in series by the applicant and is thus known, with the aid of two sample embodiments. Here, the worm 16 is made of plastic and the helical gear 10 is made of metal.

$h_a$ Tooth tip height factor
$h_f$ Tooth root height factor
L Spindle longitudinal axis
$m_n$ Normal modulus
p Pitch
$s_n$ Normal tooth thickness
$V_{sn}$ Ratio of $s_{n1}$ to $s_{n2}$
x Profile shift coefficient
z Number of teeth
$\alpha_n$ Normal meshing angle
$\alpha$P Known normal meshing angle
$\beta,\gamma$ Pitch angle or helix angle

|  | values per reference profile | | values sample embodiment 1 | | values sample embodiment 2 | |
| --- | --- | --- | --- | --- | --- | --- |
|  | worm | gear | worm | gear | worm | gear |
| Number of teeth z | 2 | 13 | 2 | 13 | 3 | 20 |
| Pitch angle or helix angle $\gamma, \beta$ [°] | 12.6608 | 12.6608 | 12.9000 | 12.9000 | 11.8500 | 11.8500 |
| Normal meshing angle $\alpha$B[°] | 21.0000 | | 20.0000 | | 17.0000 | |
| Normal modulus $m_n$ [mm] | 0.9800 | | 0.9868 | | 0.6278 | |
| Pitch circle diameter $d_0$ [mm] | 8.94 | 13.06 | 8.84 | 13.16 | 9.17 | 12.83 |
| Tooth tip height factor $h_a$ | 1.1255 | 0.8530 | 0.4927 | 1.4728 | 1.3465 | 1.3900 |
| Tooth root height factor $h_f$ | 1.2214 | 1.2400 | 1.6177 | 0.6401 | 1.5100 | 1.4665 |
| Profile shift coefficient x | −0.3053 | 0.1647 | 0.3736 | −0.5155 | −0.1839 | −0.0461 |
| Normal tooth thickness $s_n$ [mm] | 1.3096 | 1.6633 | 1.8184 | 1.1798 | 0.9156 | 0.9684 |
| Ratio Vsn | 0.7874 | | 1.5413 | | 0.9455 | |
| Tip circle diameter $d_a$ [mm] | 10.550 | 15.052 | 10.550 | 15.050 | 10.631 | 14.517 |
| Root circle diameter $d_f$ [mm] | 5.950 | 10.950 | 6.385 | 10.880 | 7.045 | 10.930 |

The normal meshing angle $\alpha_n$, the normal tooth thickness $s_n$ and the root circle diameter $d_f$ are the quantities of the proposed involute toothing which are specifically changed. These quantities are shown highlighted in the table. The other values indicated in the table change by virtue of the connection among the different quantities per the formulas.

LIST OF REFERENCE SYMBOLS

10 Helical gear
10P Known helical gear
12 First toothing segment
14 Teeth
16 Worm
16P Known worm
18 Second toothing segment
20 Teeth
22 Helical gearing
24 Gearwheel pairing
26 Involute toothing
28 Drive shaft
30 Spindle nut
32 Internal thread
34 Spindle
A Cutout
$d_0$ Pitch circle diameter
$d_a$ Tip circle diameter
$d_f$ Root circle diameter
e Gap width
h Tooth height

The invention claimed is:
1. A gearwheel pairing for a helical gearing, comprising:
a helical gear with a first toothing segment;
a worm with a second toothing segment;
wherein the first toothing segment and the second toothing segment are arranged to intermesh and form an involute toothing when intermeshed;
wherein materials of the first toothing segment and the second toothing segment are selected such that when the first toothing segment and the second toothing segment are intermeshed a plastic-metal material pairing results, and
wherein one of the first toothing segment and the second toothing segment is made of plastic and has a first normal tooth thickness and another of the first toothing segment and the second toothing segment is made of metal and has a second normal tooth thickness, wherein a ratio of the first normal tooth thickness to the second normal tooth thickness is increased by a range with respect to a reference profile, wherein the range is 10 to 200% with respect to a reference profile,
wherein the worm of the reference profile has a normal tooth thickness (sn) of 1.3096 mm and a profile shift coefficient (x) of −0.3053, and
wherein the helical gear of the reference profile has a normal tooth thickness (sn) of 1.6633 mm and a profile shift coefficient (x) of 0.1647, resulting in a ratio Vsn of 0.7874.
2. The gearwheel pairing according to claim 1, wherein the toothing segment made of plastic has a root circle diameter which is increased by 5 to 40% with respect to the reference profile.

3. The gearwheel pairing according to claim 1, wherein the toothing segment made of plastic has a root circle diameter which is increased by 6 to 20% with respect to the reference profile.

4. The gearwheel pairing according to claim 1, wherein a normal meshing angle of the involute toothing differs by ±5° from the reference profile.

5. The gearwheel pairing according to claim 1, wherein a normal meshing angle of the involute toothing is reduced by 1 to 4° relative to the reference profile.

6. The gearwheel pairing according to claim 1, wherein the worm is connected to a drive shaft and the first toothing segment of the helical gear and the second toothing segment of the worm are intermeshed.

7. The gearwheel pairing according to claim 6, wherein the helical gear consists of metal, and is formed as a spindle nut and interacts with a spindle and the worm consists of plastic.

8. The gearwheel pairing according to claim 1, wherein the range is 15 to 120% with respect to the reference profile.

9. A method for using the gearwheel pairing as claimed in claim 1, comprising activating the gearwheel pairing to adjust a seat-length of a vehicle seat, wherein the gearwheel pairing is coupled to the vehicle seat.

10. A gear pairing, comprising:
a helical gear with a helical toothing segment, the helical toothing segment comprising either a plastic toothing segment or a metal toothing segment;
a worm with a worm toothing segment, wherein:
the worm toothing segment comprises the plastic toothing segment if the helical toothing segment comprises the metal toothing segment;
the worm toothing segment comprises the metal toothing segment if the helical toothing segment comprises the plastic toothing segment; and
wherein the helical toothing segment and the worm toothing segment are arranged to intermesh with a plastic-metal material pairing and form an involute toothing when intermeshed;
wherein the plastic toothing segment has a plastic normal tooth thickness;
wherein the metal toothing segment having a metal normal tooth thickness, wherein a ratio of the plastic normal tooth thickness to the metal normal tooth thickness is increased by a range with respect to a reference profile, wherein the range is 10 to 200% with respect to a reference profile,
wherein the worm of the reference profile has a normal tooth thickness (sn) of 1.3096 mm and a profile shift coefficient (x) of −0.3053, and
wherein the helical gear of the reference profile has a normal tooth thickness (sn) of 1.6633 mm and a profile shift coefficient (x) of 0.1647 resulting in a ratio Vsn of 0.7874.

11. The gear pairing according to claim 10, wherein the plastic toothing segment has a root circle diameter which is increased by 5 to 40% with respect to the reference profile.

12. The gear pairing according to claim 10, wherein the plastic toothing segment has a root circle diameter which is increased by 6 to 20% with respect to the reference profile.

13. The gear pairing according to claim 10, wherein a normal meshing angle of the involute toothing differs by ±5° from the reference profile.

14. The gear pairing according to claim 10, wherein a normal meshing angle of the involute toothing is reduced by 1 to 4° relative to the reference profile.

15. The gear pairing according to claim 10, wherein the worm is arranged to be connected to a drive shaft.

16. The gear pairing according to claim 10, wherein the helical gear is formed as a metal spindle nut and interacts with a spindle and the worm is formed of plastic.

17. The gear pairing according to claim 10, wherein the range is 15 to 120% with respect to the reference profile.

18. A gear pairing, comprising:
a helical gear with a helical toothing segment, the helical toothing segment comprising either a plastic toothing segment or a metal toothing segment;
a worm with a worm toothing segment, wherein:
the worm toothing segment comprises the plastic toothing segment if the helical toothing segment comprises the metal toothing segment;
the worm toothing segment comprises the metal toothing segment if the helical toothing segment comprises the plastic toothing segment; and
wherein the helical toothing segment and the worm toothing segment are arranged to intermesh with a plastic-metal material pairing and form an involute toothing when intermeshed;
wherein the plastic toothing segment has a plastic normal tooth thickness;
wherein the metal toothing segment having a metal normal tooth thickness, wherein a ratio of the plastic normal tooth thickness to the metal normal tooth thickness is increased by a range with respect to a reference profile, wherein the range is 15 to 120% with respect to a reference profile;
wherein a normal meshing angle of the involute toothing is reduced by 1 to 4° relative to the reference profile; and
wherein the plastic toothing segment has a root circle diameter which is increased by 6 to 20% with respect to the reference profile,
wherein the worm of the reference profile has a root circle diameter $d_f$ of 5.950 mm, and
wherein the gear of the reference provide has a root circle diameter $d_f$ of 10.950 mm.

* * * * *